TRAVELING WAVE PARAMETRIC AMPLIFIER

Filed Jan. 13, 1964 3 Sheets-Sheet 1

INVENTOR
GLICK U. BISHOP
BY Julian C. Renfro
ATTORNEY
Earl C. Hancock
AGENT

TRAVELING WAVE PARAMETRIC AMPLIFIER

Filed Jan. 13, 1964 3 Sheets-Sheet 2

INVENTOR
GLICK U. BISHOP
BY Julian C. Renfro
ATTORNEY

Earl C. Hancock
AGENT

INVENTOR
GLICK U. BISHOP
BY Julian C. Renfro
ATTORNEY
Earl C. Hancock
AGENT

United States Patent Office 3,229,214

Patented Jan. 11, 1966

3,229,214

TRAVELING WAVE PARAMETRIC AMPLIFIER

Glick U. Bishop, Jefferson County, Colo., assignor to Martin-Marietta Corporation, Baltimore, Md., a corporation of Maryland Filed Jan. 13, 1964, Ser. No. 339,066
8 Claims. (Cl. 330—4.6)

This is a continuation in part of my co-pending application, Serial No. 7,164, filed February 8, 1960 entitled "Parametric Amplifier," now abandoned.

This invention relates to parametric amplifiers, and more particularly to a traveling wave parametric amplifier utilizing techniques to obtain low-noise amplification of high frequency signals at a minimum of pump power.

One principle proposed for microwave amplification rests on the fact that when an electromagnetic wave is suitably coupled to an energy storage element whose value is made to vary in a proper way, energy may be extracted from the source which drives the energy storage element, which energy is transferred to the fields of the electromagnetic wave and can thus be used for amplifying signals defined by the wave. Amplifiers constructed to utilize this principle are called variable parameter amplifiers, or parametric amplifiers. These amplifiers employ the bound electrons which surround the atoms of material rather than the free electrons in a beam.

An introduction to the amplifying process involved in a parametric amplifier may be had by considering a simple series L-C circuit wherein the spacing between the plates of the capacitor can be varied at a rate corresponding to the frequency of an A.C. energy source. If at the time the voltage across the capacitor goes through a positive or a negative maximum, the plates are suddenly pulled apart, work must be involved in separating the charge on the two plates, and this work is transformed into energy in the electric fields existing across the plates. Capacitance C is reduced as the plates are separated, and since $V=Q/C$, the voltage V must be amplified for a given charge Q.

Consider next that each time the A.C. voltage from the energy source goes through zero, the plates are suddenly pushed back together again. Inasmuch as there is no charge on the capacitor when the plates are pushed together at the zero voltage point, no work or energy will be imparted to the electrostatic fields between the plates. The net result is amplification of the voltage across the capacitor, the flow of energy being from the means that pumps the plates into the fields of the resonant tank. It should be noted that for this circuit the pumping of the capacitor plates is repeated periodically at approximately an integral multiple of the signal frequency.

Although the proper phase relation between the capacitor plate movement and the voltage from the energy source must be properly maintained in order to produce amplification instead of attenuation in the aforementioned tank circuit, no such phase restriction is required when two separate tank circuits are interconnected by a variable capacitance. In such an instance, the mixing action of the variable capacitance serves to couple the tanks together even though tanks of different resonant frequencies are involved, provided that the capacitance is varied at a rate approximately equal to the sum of the resonant frequencies. The two tank amplifier is of considerable value in the study of equivalent variable parameter circuits.

Parametric amplifiers are in many instances preferable to other low noise amplifiers such as masers and traveling wave tubes. Although a maser amplifier presently represents the amplifier capable of operating at the lowest noise figure, the amount of equipment and power necessary to provide refrigeration and a large magnetic field often make the use of this device prohibitive. Masers also have an additional drawback in that they have slow recovery from overloads caused by leakage through a radar duplexer.

Recently-developed low-noise traveling wave tubes still have the disadvantages of cathode deterioration, susceptibility to shock and vibration, high initial cost, as well as the need for a magnetic field.

Parametric amplifiers overcome many of these disadvantages, and these amplifiers fall into several categories, such as parametric up-converters, regenerative type parametric amplifiers, and traveling-wave types. First considering the parametric up-converter, it is characterized by the frequency relationship:

$$f_p=f_2-f_1$$

where $f_p$ is pump freq., $f_1$ is the signal frequency, and $f_2$ is the output frequency, with the maximum gain for this device being $f_2/f_1$. The up-converter has its main application in amplifying signals in the lower frequency ranges, for the high pump frequencies necessary in order to obtain significant gain at microwave frequencies are almost impossible to obtain.

The regenerative amplifier can amplify because of the effective negative resistance which results from sum frequency pumping. For this amplifier, $$f_p=f_s+f_i$$

where $f_s$ is the signal frequency and $f_i$ is the lower sideband frequency sometimes referred to as the idler frequency. The configuration of this amplifier often takes the form of a variable reactance device (known as a varactor) positioned in a cavity which is simultaneously resonant at $f_s$ and $f_i$. Pump power is impressed across the varactor, which serves as a time variable energy storage coupling device between the two resonant circuits.

Unfortunately, the regenerative amplifier is highly unstable due to the negative resistance regenerative effect. A circulator or some similar device must be used to isolate the load from the amplifier since it is highly sensitive to small changes in load impedance. The circulator must also serve to prevent noise generated in the load from re-entering the amplifier, where reamplification would occur. Although very high gains are possible with this type of amplifier, performance stability is very poor and bandwidths are very small.

A traveling wave parametric amplifier has several advantages over the regenerative type in that it has larger bandwidth and unilateral amplification with no increase in noise. Like the regenerative amplifier, the frequency relationship is $f_s+f_i=f_p$. P. K. Tien of Bell Telephone Laboratories has shown that if a signal and idler frequency wave can propagate in a circuit whose frequencies and phase constants can be represented by:

$$f_s+f_i=f_p$$
$$B_s+B_i=B_p$$

then unilateral amplification in the direction of pump power flow can occur. It is important that the circuit does not propagate a wave at the upper sideband or at the harmonics of the signal and idler frequencies because if it does, the gain and noise figure of the amplifier will be seriously impaired.

Nevertheless, attempts have been made to design a traveling-wave structure for S-band amplification. Traveling wave structures become more difficult to design as the signal frequency is increased, with one of the prime problems being that of required pump power. Since pump power required is dependent upon $I^2R_s$ losses where $R_s$ is the series resistance of the varactor, the pump power requirement increases as the square of the pump frequency for a given voltage swing in a given varactor. Furthermore, the coaxial type structure does not lend itself to effcient utilization of pump power in the microwave region because the Q thereof is very low at the pump frequency and therefore requires a large amount of power to pump a varactor over a reasonable change in reactance.

Since a resonant cavity can be designed to have a very high Q in the microwave region, according to the present invention, varactors were placed into such a cavity resonant at the pump frequency. Since it is desirable to suppress any upper sidebands or higher order harmonics, a band-pass filter was incorporated into the device comprised of alternate high and low impedance line sections. It is apparent that the high impedance sections of such a filter may be made resonant at the pump frequency, while still retaining the filter function of upper sideband suppression if the following frequency relationships are maintained:

$$f_p \cong f_s$$
$$f_s < f_c < f_p$$
$$f_i < f_c$$

where $f_p$ is pump frequency, $f_s$ is signal frequency, $f_i$ is idler frequency, and $f_c$ is the lower filter cutoff frequency.

By designing a filter configuration so that a varactor can be inserted in each high impedance line section, and by providing means to couple pump power into each cavity, it is then only necessary to adjust the phase velocities of $f_s$, $f_i$ and $f_p$ in order to realize the operation of a traveling wave parametric amplifier as previously pointed out by P. K. Tien. This phase adjustment can be accomplished by utilizing shunt susceptances along the structure to provide control of the phase velocities or by varying the pump frequency to obtain the proper phase relationship for amplification at the desired signal frequency. The technique of varying the pump frequency to obtain proper phase relationship for amplification provides, according to the present invention, means for electronically tuning the amplifier or providing frequency conversion with gain from this signal frequency to the idler frequency.

The present invention therefore is a device having a very low noise figure which utilizes a unique structure to (1) achieve reasonable gain and reasonable bandwidth with a minimum of pump power; (2) provide, when desired, a low-noise electronically tunable parametric amplifier; and (3) provide an amplifier which can be used in the frequency converter mode while maintaining its low-noise and gain characteristics. More specifically, the present invention utilizes a signal line and a pump line disposed in a common housing, with the signal line incorporating an integral band pass filter arrrangement comprising high and low impedance waveguide sections. In the high impedance sections of the signal line, a plurality of variable shunt susceptances are employed which in turn allow the high impedance sections to be turned to resonance at the pump frequency and makes possible much more efficient utilization of pump power. The variable reactance devices (varactors) serve as a time variable coupling between the signal power and the pump power, and as a result of this time variable coupling, parametric amplification occurs according to well known principles. More specifically, power from the pump is transferred to the incoming signal in controlled amounts as the signal travels down the signal line, thereby resulting in an overall gain in signal amplitude from the input to the ouput of the amplifier.

After the dimensions for the low-pass filter section are determined so that the high impedance sections of the filter can be made resonant at the $TE_{201}$ mode of the pump frequency, it is necessary to establish input and output transitions for the signal line. This transition can be a high impedance back-cavity transition from a 50-ohm coaxial line to a 50-ohm waveguide section, which is broad band and mechanically straightforward.

A waveguide designed to propagate the pump frequency in the $TE_{10}$ mode is placed parallel to the signal line, and pump power is coupled from this waveguide into each cavity by means of a series of apertures and adjustable probes. The amount of pump power coupled into each cavity can then be controlled by positioning the probe associated therewith. External bias may be supplied to each varactor if desired and each cavity may include an adjustable tuning screw for varying the resonant frequency of the cavity.

Other objects, features and advantages of the present invention will be apparent from the appended drawings in which.

Figure 1:
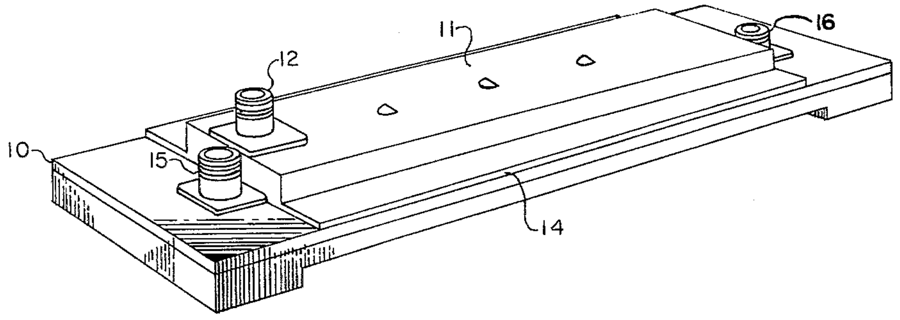
FIGURE 1 is a perspective view of a typical parametric amplifier employing the principles of this invention.

Referring to FIGURE 1, the parametric amplifier 10 is illustrated to be of the waveguide type, designed for low noise amplification in the kilomegacycle range. It employs a pump line 11 having an input terminal 12 and a signal line 14 having an input terminal 15 and an output terminal 16. The source of pump power may be a klystron oscillator tube, set to operate at slightly more or slightly less than twice the frequency of the signal, which is connected into the amplifier at input terminal 12. Pump line 11 is dimensioned so as to support the $TE_{10}$ mode of the pump frequency, and is terminated in a load arranged to absorb any residual pump power which is not coupled into the signal line. This load may be external to pump line 11, which would be connected to a terminal at the end of pump line 11, or may be a load built into the waveguide to serve as a terminating load.

Figure 2:
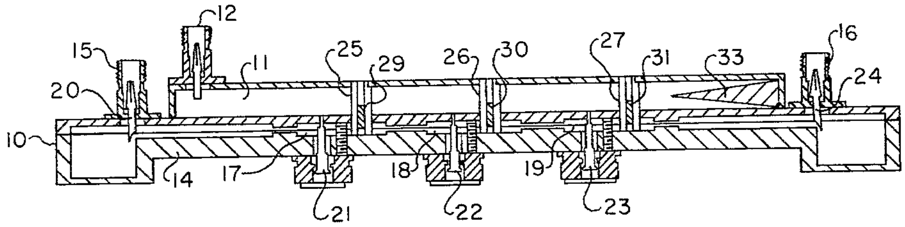
FIGURE 2 is a cross-sectional view taken along the length of a parametric amplifier according to this invention, with portions removed to reveal significant internal construction.

Referring to FIGURE 2, a probe 20 injects the signal from input terminal 15 into the signal line 14 whereas probe 24 connects the amplified output signal to output terminal 16, to which an appropriate transmission line such as a coaxial cable or waveguide may be connected. Signal line 14 is of unique configuration in that it is a variable impedance band-pass filter designed in such a way as to make the high impedance sections resonant cavities in the $TE_{201}$ mode of the pump frequency $f_p$. These cavities 17, 18 and 19 are interconnected by low impedance sections, with cavities 17 and 19 being connected to the signal input 15 and signal output 16, respectively, by low impedance matching sections. Since the integral band-pass filtering arrangement is designed to cut off all frequencies above a certain value, this of course obviates the need for an external upper side band filter. The pump frequency is the strongest distorting signal that could be present at the output, but its appearance at terminal 16 is prevented by the filtering action.

A voltage variable capacitor is disposed in each high impedance cavity of the amplifier, according to this invention. One example of these variable reactances may be MA460A varactors, manufactured by Microwave Associates Incorporated, of Burlington, Massachusetts. Varactors 21, 22, and 23 are singly disposed in cavities 17, 18 and 19, respectively, although more than one varactor could be employed in each cavity if desired, in order to further increase pumping efficiency.

Varactors are PN junction semiconductor diodes designed for low loss at high frequencies, with their capacitance depending upon the voltage across the junction. This property plus the fact that they have low loss permit varactors to be used in low-noise amplifiers, efficient harmonic generators, and high power control circuits. Although varactor diodes can be used at low frequencies, the most remarkable applications of varactors involve high frequencies, beginning perhaps at 1 to 10 megacycles and continuing up to above 50 kilo-megacycles.

As previously indicated, according to this invention, pump power is transferred to the incoming signal as the signal travels down the signal line, resulting in an overall gain in signal amplitude from input to the output of the amplifier. So that such may be accomplished, an aperture is provided to connect each cavity with the pump line, and an adjustable probe disposed in each aperture provides a means of coupling a variable amount of pump power to the varactors. Apertures 25 through 27 are located in cavities 17 to 19, respectively, with coupling means 29 to 31 disposed in respective apertures and extending into the cavities as seen in FIGURE 2. The pump power that is not transferred into cavities 17 to 19 from pump line 11 is absorbed in terminating load 33, which of course could be an external load connected to pump line 11 by an additional terminal if this should be desired.

Figure 3:
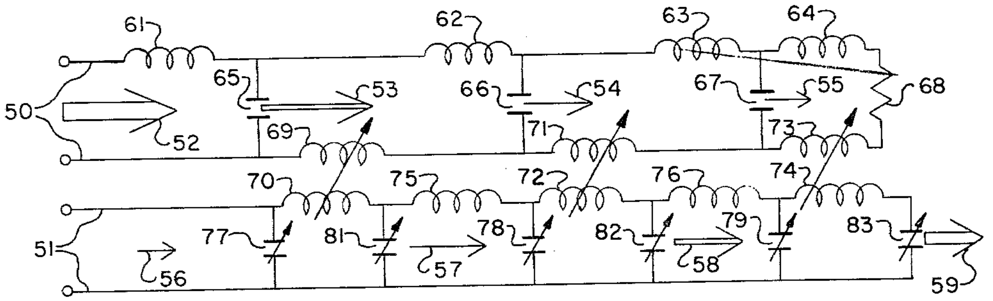
FIGURE 3 is an equivalent lumped constant circuit illustrating the principles of this invention.

FIGURE 3 is an equivalent circuit containing lumped constants for illustrating the operating relations and principles of the structure shown in FIGURES 1 and 2. The pump line and the signal line are represented in FIGURE 3 by lines 50 and 51 respectively. Arrows 52 through 55 are shown in diminishing amplitude along pump line 50 which indicates the decrease of pump power present in line 50 while arrows 56 through 59 are shown in increasing magnitude along signal line 51 which indicates that the signal is amplified as it flows through the amplifier structure by the transfer of pump power from pump line 50. Inductances 61 through 64 and capacitances 65 through 67 represent the equivalent network for the waveguide of pump line 50, and the pump line terminating impedance is represented by element 68. Pump power is transferred to the signal line through the coupling between inductive elements 69 and 70 which of course represents the coupling of pump power into cavity 17 while elements 71, 72 and 73, 74 represent the coupling of power into cavities 18 and 19 respectively. The inductances of the low impedance sections in the signal line are represented by elements 75 and 76 while elements 77, 78, and 79 represent the variable shunt susceptance presented by the adjustable tuning screws in the cavities of the signal line. Elements 70, 77 and 81 as well as their counterparts along line 51 are designed to resonate at the frequency of the pump source.

The voltage variable capacitance produced by the varactors in each of the cavities is shown as variable capacitances 81, 82 and 83. The rate of change of these capacitances is a function of the frequency of the pump source since the capacitance of the varactors in each of the high impedance cavity sections is determined by the voltage thereacross.

The voltage across each varactor is proportional to the amount of pump power coupled into its cavity, so provisions are, therefore, made for varying the amount of coupling into the cavities by constructing coupling means 29 through 31 to be adjustable. As seen from the enlarged showing of one of the cavities illustrated in FIGURE 6, a coupling means 29 may comprise a sleeve 34 of non-conducting material such as Teflon, secured in a position extending from the bottom of its cavity to the upper-inner portion of signal line 14, and a coupling screw 36, constituting a probe, threadedly disposed in threaded hole 35 which extends substantially the entire length of the rod. This coupling screw is adjustable, such as by a screwdriver inserted through access port 37, in order to vary the amount of pump power coupled to each cavity. The adjustment of each coupling screw of the amplifier is important:

So that pump power coupled to each cavity can be optimized, i.e., to utilize the minimum power required to obtain desired gain per stage. It should be noted that it may be desired to operate the amplifier with less gain per stage and hence obtain greater bandwidth. This adjustment is necessary to compensate for varying varactor characteristics and the fact that as pump power is coupled from the pump line it is necessary to increase the ratio of remaining pump power coupled to succeeding cavities.

A tuning screw 38 is provided in the bottom of each cavity of the amplifier, which is threaded into the lower wall of each cavity.

The purpose of tuning screw 38 is to provide a variable shunt susceptance (variable in that it can be changed by moving screw 38 in or out of the cavity) which changes the resonant frequency of the cavity. This tuning screw has the purpose of providing means:

To tune the cavity resonance close to the frequency of the pump and thus allow the highest voltage possible to appear across the varactor for a minimum of pump power. Since, adjustment of screw 38 will make a slight change in the phase relationships of the signals involved, a slight adjustment in the pump frequency may be required to optimize the phase relationship between pump frequency and signal frequency. These two adjustments are alternately adjusted until the maximum gain to pump power ratio is achieved.

Figure 6:
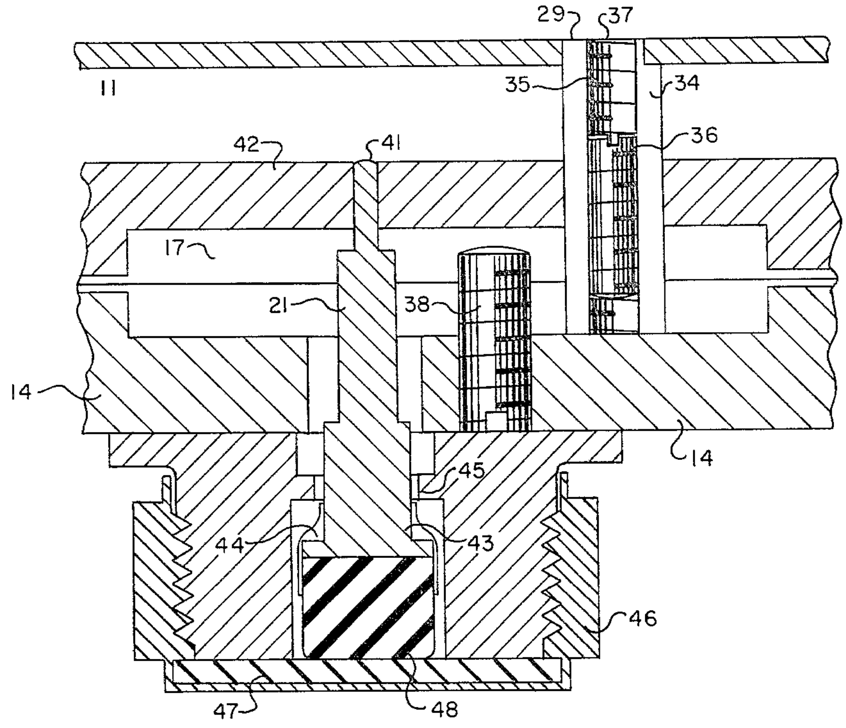
FIGURE 6 is an enlarged view showing details of a typical cavity of the parametric amplifier of FIGURES 1, 2 and 4.

FIGURE 6 shows in detail the mounting of varactor 21 in cavity 17. In particular, the small pin or anode end 41 of varactor 21 is shorted to the cavity wall 42 which is common to pump line 11 and signal line 14. As can be seen in FIGURE 6, one method of accomplishing this short is to drill a hole in common wall 42 of the proper size to allow a snug fit of pin end 41 therein.

The large or cathode end 43 of varactor 21 is RF shorted to the other side of cavity 17 but is D.C. isolated therefrom. This RF short is accomplished by placing a thin (.001 inch, for instance) insulating film 44 around large end 43 and inserting the entire varactor and film assembly through a hole 45 in the wall of cavity 17, hole 45 being designed to snugly receive this varactor and film assembly. The purpose of the D.C. isolation of end 43 of the varactor is to permit the introduction of a D.C. bias potential across varactor 21 if this should be desirable or necessary. Experiments have shown that a slight improvement in the noise figure can be obtained by adding this D.C. bias.

After varactor 21 has been correctly placed in cavity 17, it is held in place by retaining cap 46 which is also D.C. isolated from varactor 21 by insulator 47 and 48.

It should be noted that each cavity of amplifier 10 is a high Q cavity made to resonate at the pump frequency, and as a result of this, a very high voltage at the pump frequency is developed across each varactor. In contrast, previous traveling wave parametric amplifiers have not utilized high Q cavities resonant at the pump frequency for accommodating the variable reactance device utilized, and hence the prior art devices have required a great deal more pump power than is required by the present invention in order to accomplish the same gain.

Figure 4:
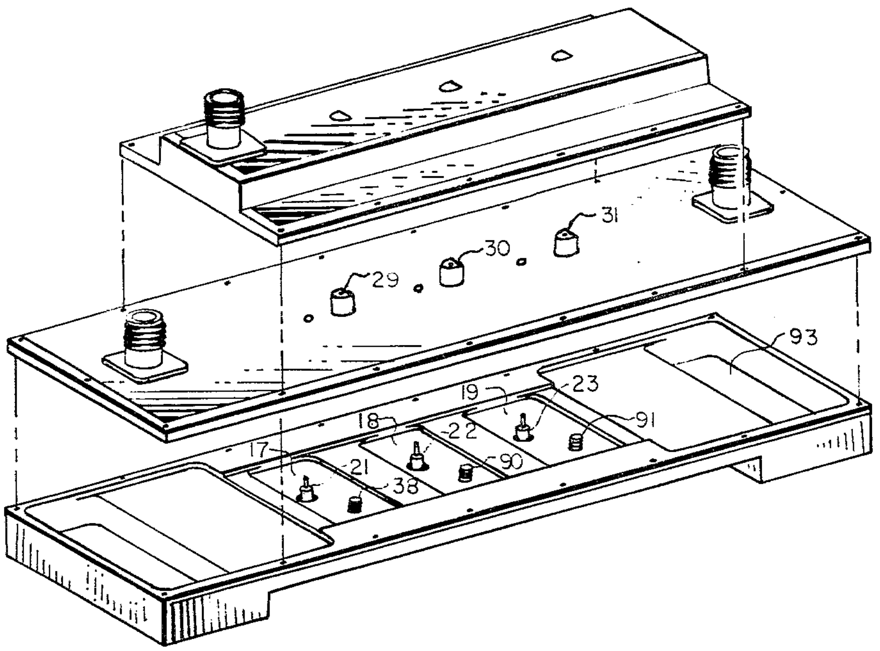
FIGURE 4 is an exploded view of the parametric amplifier of FIGURES 1 and 2.

FIGURE 4 presents an exploded view of an amplifier in accordance with this invention and from this can be obtained a better understanding of the relation of the physical structure thereof. The element numbers in FIGURES 1, 2 and 6 are similarly numbered in FIGURE 4 including coaxial terminals 12, 15, and 16, pump line 11, signal line 14, common wall 42, cavities 17 through 19, coupling probes 29 through 31 and varactors 21, 22, and 23. The position of tuning screw 38 for tuning cavity 17 as mentioned hereinbefore can be clearly seen as it is also evident for cavities 18 and 19 by tuning screws 90 and 91.

In order for the amplifier to operate, a transition device must be incorporated to match the terminal low impedance sections of the filter of signal line 14 with the impedance that will be seen at terminals 15 and 16. The techniques for transforming the filter impedance to coaxial or waveguide connections are well known in the art, and the amplifier as shown in FIGURE 4 incorporates back-cavity sections 92 and 93 for transition to 50-ohm coaxial cable for one amplifier design actually constructed. It should be noted, of course, that a transition to standard waveguide could have been accomplished for the amplifier that was actually constructed by tapering the 19 ohm low impedance sections to a standard waveguide impedance. Transition to waveguide terminals has been accomplished in a C-band version of the amplifier.

Figure 5:
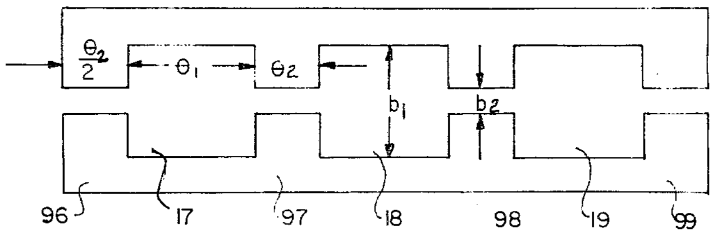
FIGURE 5 is a view of an array of cavities to reveal typical dimensioning.

The design philosophy which enables the construction of a band-pass filter to meet the amplifier requirements while simultaneously providing resonance of the high-impedance sections at the pump frequency may best be understood by referring to FIGURE 5 wherein cavities 17, 18, and 19 are shown in their proper structural relationships with the other elements of the amplifier generally being omitted for purposes of clarity. To further illustrate this design philosophy, consider some exemplary calculations which were used in designing one amplifier that was actually built and successfully operated in accordance with this invention for the following operating parameters:

Frequency of the input signal ($f_s$)=2600 mc.
Frequency of the pump ($f_p$=5000 mc.
Pump frequency wavelength $\lambda_p$=6 cm.
Upper cutoff frequency of band-pass filter ($f_{cf}$)=2700 mc.
Upper cutoff wavelength of band-pass filter ($\lambda_{cf}$)=11.1 cm.
Cutoff frequency of signal line ($f_{cs}$)=2100 mc.
Cutoff wavelength of signal line ($\lambda_{cs}$)=14.2 cm.
Cutoff frequency of pump line ($f_{cp}$)=3950 mc.
Cutoff wavelength of pump line ($\lambda_{cp}$)=7.6 cm.

As is well known in the art, a band-pass waveguide filter can be composed of alternate high impedance sections such as 17 through 19 and low impedance sections such as 96 through 99 as shown in FIGURE 5. Since it is desired that each high impedance cavity be made resonant in the $TE_{201}$ mode of the pump frequency, dimension $\theta$ (must be one half of the wavelength of the pump frequency.

Next it is necessary to determine the wavelength at the cutoff frequency for the filter waveguide section ($\lambda_{gfc}$), and this is found by the equation:

$$\lambda_{gfc}=\frac{\lambda_{cf}}{1-\left(\frac{\lambda_{cf}}{\lambda_{cs}}\right)}2=\frac{11.1}{.625}=17.8 \text{ cm.}$$

The guide wavelength of the pump frequency in the signal line must then be determined in order to find the physical length $\theta_1$. Since the cutoff wavelength of the signal line $TE_{20}$ propagation is equal to ½ ($\lambda_{cs}$) or 7.1 cm., the guide wavelength of the pump frequency in the signal line is:

$$\lambda_{gp}=\frac{\lambda_p}{\sqrt{1-\left(\frac{\lambda_p}{\frac{1}{2}\lambda_{cs}}\right)^2}}=\frac{6}{\sqrt{1-\left(\frac{6}{7.1}\right)^2}}=11.1 \text{ cm.}$$

Then:

$$\theta_1=\tfrac{1}{2}\lambda_{gp}=5.55 \text{ cm.}$$

The above calculations for $\theta_1$ have been based on the assumption that the cavity is unperturbed when in reality it is loaded by the varactor and the coupling screw which has the effect of reducing $\lambda_{gp}$ for a constant pump frequency. In addition, it is desirable to have a variable loading device such as a tuning screw mentioned hereinbefore to resonate the cavity, and therefore $\lambda_{gp}$ should be further reduced in a practical embodiment. Laboratory measurements have indicated that for a reasonable range of adjustment of the resonant frequencies for the cavities at the frequencies herein specified, $\lambda_{gp}$ should be modified by a factor of 0.64. Thus a reasonable range of tuning screw loading around 5000 mc. was obtained by making the dimension $\theta_1$ equal to (0.64)(5.55) cm. or 3.5 cm.

$\theta_1$ in electrical degrees with respect to the filter cutoff frequency guide wavelength ($\lambda_{gfc}$) is equal to $$\frac{\theta_1}{\lambda_{gfc}}(360°)=\frac{3.5}{17.8}(360°)=70°$$

If $\theta_2$ is selected to be equal to 35° or 1.75 cm., there will be a narrow spurious response at $$\frac{180°}{70°}\ (2700 \text{ mc.})=7000 \text{ mc.}$$

and a wide response at 14,000 mc., but neither of these responses is objectionable.

Next it is necessary to determine the ratio of $Z_{01}/Z_{02}=P$ where $Z_{01}$ is the characteristic impedance of the high impedance section and $Z_{02}$ is the characteristic impedance of the low impedance section. Then:

$$P=\frac{\cot\ (\theta_{1/2})}{\tan\ (\theta_{2/2})}=\frac{\cot 35°}{\tan 17.5°}=4.5$$

The value of the zero frequency characteristic impedance ($Z_{10}$) is selected to be 50 ohms and $Z_{01}$ is determined from the relation:

$$\frac{Z_{01}}{Z_{10}}=\frac{\frac{\theta_1}{\theta_2}+P^{1/2}}{\frac{\theta_1}{\theta_2}+\frac{1}{P}}=\frac{2+4.5}{2+.22}=1.7$$

and:

$$Z_{01}=50(1.7)=85 \text{ ohms}$$
$$Z_{02}=Z_{01}/P=19 \text{ ohms}$$

The height of the high impedance section of the filter ($b_1$) can be found from the equation:

$$Z_{01}=\frac{60\pi^2 b_1}{a\sqrt{\epsilon}}\ \frac{(1)}{\sqrt{1-\left(\frac{fcs}{fcs}\right)^2}}$$

where: $a$=transverse width of the section of line and is pre-determined as equal to 2.8 inches since the signal line cutoff frequency ($fcs$) has been stipulated as 2100 mc.

Solving:

$$b_1=\frac{Z_{01(a)}(\sqrt{\epsilon})\sqrt{1-\left(\frac{fcs}{fcf}\right)^2}}{60\pi^2}=\frac{85(1)(2.8)\sqrt{1-\left(\frac{2100}{2700}\right)^2}}{590}$$

$$b_1=0.25 \text{ inch}$$

$$b_2=\frac{b_1}{P}=\frac{.25}{4.5}=0.057 \text{ inches}$$

The basic dimensions of the signal line structure for one example have now been determined, and the structure that was constructed in accordance therewith did achieve the desired band-pass filter characteristic as well as the desired pump frequency resonance in the high impedance sections. If it should be desired, the procedure of the foregoing example could be followed to determine the dimensions for different frequency parameters although the designer should determine for himself the particular loading effect that he wishes to achieve. The exemplary calculations listed hereinbefore substantially follow the band-pass waveguide filter calculations suggested on page 732 in volume 2 of "Very High Frequency Techniques" by the Radio Research Laboratory staff.

From the foregoing description it can be seen that the amplifier in accordance with this invention is simultaneously providing travelling wave amplification, and band-pass filtering during the amplification of an input signal. The amplification occurs in the high impedance cavity sections 17 through 19 as a result of the coupling of pump power from pump line 11 to varactors 21 to 23.

Finally, the interconnecting of cascaded cavities 17 through 19 by a series of low impedance sections provides the proper filtering action to prevent the pump frequency as well as other frequencies above the signal frequency from appearing at the signal output terminal.

The minimum number of stages of an amplifier of this type is limited to 3, because the band-pass filter characteristic cannot be achieved with less than 3 high impedance sections. The maximum number of stages is theoretically unlimited, but as a practical matter, the use of more than 6 or 7 stages is probably not advantageous inasmuch as the amplifier in its later stages will start to saturate.

The present configuratioin is further unique in that the signal line structure functions as a band-pass filter designed so that the high impedance sections resonate in the $TE_{201}$ mode of the pump frequency $f_p$. The cutoff frequency $f_c$ of the band-pass filter is designed to fall above $f_p-f_s$, but below $f_p$. The signal output appears at output terminal 16 and can be either the original input signal frequency or the idler frequency amplified with respect to input signal. The signal appearing at the output is dependent upon the pump frequency utilized and/or the phase relationships established by adjustment of shunt susceptances in the signal and/or pump lines. The sum frequency $f_p+f_s$ is not allowed to flow due to the band-pass filter characteristic. Thus, the filter construction according to the present invention does not allow pump power or sum frequency power to flow in any stage of the amplifier, thereby increasing efficiency and reducing noise.

As an example of the operation of this device, assume a signal frequency of 2500 mc. The pump frequency in such an instance would be set to approximately 4900 mc., and since pump power, as well as signal power is impinging on each diode (which is a non-linear device), a mixing action takes place which produces the sum and difference of these two frequencies, which are 7400 and 2400 mc. respectively, as well as all harmonics of 7400, 4900, 2400, and 2500 mc. Since in the straight through mode, the signal frequency of 2500 mc. is the only signal at the output that is of interest, the other frequencies are to be eliminated inasmuch as they represent noise. Accordingly, the band-pass filter is arranged to cut off everything above 2700 mc., which is accomplished by constructing the band-pass filter section as described in detail for FIGURE 5. The band-pass filter action then prevents the pump frequency and the sum frequency from appearing at the output along with all harmonics occurring above 2700 mc. In actual operation of an amplifier of this type, the lower side-band frequency did not appear at the output. The characteristics of this amplifier preclude the requirement for any filtering external to the device.

Several variations of the basic device according to this invention are reasonably possible, for although the present amplifier was designed for use as an S-band amplifier, by scaling the amplifier it can be made to operate at higher or lower frequency bands. The feasibility of such scaling has proven in the design, construction and operation of a C-band amplifier which incorporates the teachings of this invention.

The present amplifier possesses great stability even under severe environmental conditions and over long periods of time, despite slight variations in load impedance. The fact that reasonable gain and reasonable band-width can be obtained in the present invention with very low pump power requirements makes it feasible to employ an all semi-conductor pump supply. Furthermore, the present amplifier is simple to tune, has minimum maintenance problems and requires no bias supply, although the varactors are arranged to receive either a positive or a negative bias if such be required by a particular operating circumstance. These advantages plus the adaptability of this invention to various form factors and the ease of its incorporation as the main supporting structure of a package suggest its wide use for military and commercial purposes, particularly in the range from 1000 mc. to 10,000 mc.

Typical performance of amplifiers constructed in accordance with FIGURE 1 and FIGURE 2 and operated in a manner as described previously indicates the soundness of the invention in meeting the objectives of low-noise microwave amplification with a minimum amount of pump power.

An S-band amplifier has been operated with a gain of 20 decibels at a signal frequency of 2600 megacycles per second. The pump frequency and power were 5000 megacycles per second and 10 milliwatts respectively. The single channel noise figure was 2.5 decibels and the instantaneous bandwidth was 30 megacycles per second. This amplifier was then turned by varying the pump frequency over a range of 25 megacycles per second which resulted in a change of amplification frequency of 100 megacycles per second.

A C-band amplifier was operated at a signal frequency of 4400 megacycles per second and a pump frequency of 8200 megacycles per second. The gain achieved was 20 decibels with 20 milliwatts of pump power. The noise figure was 2.6 decibels and the instantaneous bandwidth was measured as 100 megacycles per second.

Many other variations within the spirit of this invention will be readily apparent to those having normal skill in the art.

It is to be realized that this invention has been described in conjunction with an exemplary device and is not to be limited thereto except as required by the appended claims. Many modifications of the structure shown and described are possible without departing from the spirit of the invention. For instance, the pump line and the signal line can be physically separated with small sections of transmission line connecting apertures in the pump line with the cavities in the signal line. By this means, of course, two separate probes would be used for coupling the pump power into each cavity, the one probe being positioned in a pump line aperture and the other probe being positioned at the cavity. The probes could then be provided with separate adjustments so that the amount of pump power that is transferred can be more finely controlled than by the single adjustment device shown and described. It is to be further understood that the foregoing modification is also intended as being exemplary only.

What is claimed is:

1. A parametric amplifier comprising a band-pass filter including a plurality of high impedance cavities interconnected by low impedance sections, means for selectively supplying high frequency pump power to each of said high impedance cavities, a plurality of variable reactance means separate from said pump power supplying means, each of said high impedance cavities being resonant at the pump frequency and having at least one of said variable reactance means arranged therein for providing amplification in the said high impedance cavity associated therewith, input means for introducing signals to be amplified to said band-pass filter, and output means for said band-pass filter, whereby signals introduced to said band-pass filter will be successively amplified in said high impedance cavities and will appear in amplified form at said output means.

2. A traveling wave parametric amplifier for operation at microwave frequencies comprising a pump line designed for supporting propagation of a pump frequency, a signal line having input means for introducing a signal frequency thereto, said signal line including a plurality of alternate high impedance sections and low impedance sections for operating as a band-pass filter by effectively filtering out frequencies greater than both the signal frequency and the difference between the pump and signal frequencies, said high impedance sections being in the form of cavities resonant substantially at the pump frequency, means for coupling pump power from said pump line into each said resonant cavity, a plurality of variable reactance means separate from said pump power coupling means each connected in a respective one of said cavities so as to provide amplification of the signal frequency therein, and output means for removing the amplified signal from said signal line.

3. A traveling wave type parametric amplifier in accordance with claim 2 in which said pump line and said signal line are each waveguide structure.

4. A parametric amplifier in accordance with claim 2 which includes means for tuning the resonant frequency of said resonant cavities to maximize the utilization of pump power in said resonant cavities during amplification, and wherein the pump frequency is slightly displaced from an integral multiple of said signal frequency.

5. The parametric amplifier as defined in claim 3 in which said pump line and said signal line have a common wall therebetween, and each of said means for coupling is disposed in an aperture in said common wall, with each coupling means being adjustable so that the desired amplification in each cavity can be closely controlled.

6. A parametric amplifier in accordance with claim 2 in which said pump line and said signal line are each wave guide structure and which includes variable shunt susceptance means for adjusting said high impedance sections so as to vary the resonant frequency thereof.

7. A parametric amplifier for operating in the kilomegacycle range comprising a wave-guide band-pass filter line, input means for coupling signals to be amplified into said band-pass filter line, a wave-guide pump line designed for supporting propagation of a pump frequency slightly displaced from an integral multiple of the frequencies of the signal to be amplified, said pump line and said signal line having a common wall therebetween, means for coupling pump power at the pump frequency into said pump line, said band-pass filter line comprising a series of interconnected low impedance sections and high impedance resonant cavities so that said band-pass filter line will have a cut-off frequency less than the pump frequency but greater than both the frequency of the signal to be amplified and the difference between the latter frequency and the pump frequency, said cavities being resonant at approximately the pump frequency, a plurality of coupling means in said common wall, each of said cavities having pump power coupled thereto from said pump line by one of said common wall coupling means, a plurality of variable reactance means separate from said coupling means, each of said cavities having at least one of said variable reactance means mounted therein so as to be excited by the pump power thereby causing the reactance of said variable reactance means to vary as a function of the pump frequency, and output means for coupling the amplified signal from said band-pass filter line whereby the signal to be amplified when introduced to said input means will be sequentially amplified in said cavities and will appear at said output means in amplified form.

8. A parametric amplifier in accordance with claim 7 further including means for tuning the resonant frequencies of said cavities so as to maximize the pump power utilization therein.

References Cited by the Examiner

UNITED STATES PATENTS

| | | | |
|---|---|---|---|
| 3,012,203 | 12/1961 | Tien | 330—4.6 |
| 3,076,149 | 1/1963 | Knechtli et al. | 330—4.6 |

ROY LAKE, *Primary Examiner.*

D. H. HOSTETTER, *Assistant Examiner.*